United States Patent [19]

Schill

[11] 4,188,870
[45] Feb. 19, 1980

[54] SKINNING MACHINE FOR BACON OR THE LIKE

[75] Inventor: Hermann Schill, Kehl, Fed. Rep. of Germany

[73] Assignee: Maja-Maschinenfabrik Hermann Schill GmbH, Kehl-Goldscheuer, Fed. Rep. of Germany

[21] Appl. No.: 893,247

[22] Filed: Apr. 5, 1978

[30] Foreign Application Priority Data

Apr. 7, 1977 [DE] Fed. Rep. of Germany ....... 2715546

[51] Int. Cl.$^2$ ............................................. A22C 17/12
[52] U.S. Cl. ......................................................... 99/589
[58] Field of Search .......................... 99/596, 584–590; 17/21, 24, 50, 52; 226/170, 171, 174, 186, 187

[56] References Cited

U.S. PATENT DOCUMENTS

| | | | |
|---|---|---|---|
| 3,076,997 | 2/1963 | Evich | 99/590 X |
| 3,142,860 | 8/1964 | Churchill | 17/1 R |
| 3,949,661 | 4/1976 | Greider | 99/589 |

*Primary Examiner*—Stanley N. Gilreath
*Attorney, Agent, or Firm*—Peter K. Kontler

[57] ABSTRACT

A skinning machine for bacon has a transporting conveyor which advances successive slabs into a passage between the discharge end of the conveyor and a pivotably mounted hold-down roller. The slabs which advance beyond the passage are engaged by the peripheral surface of a driven traction wheel which advances the slabs into the range of the skinning knife. The discharge end of the conveyor is movable up and down and moves downwardly to place the passage into register with a larger portion of the peripheral surface of the traction wheel when the conveyor advances a relatively thick slab of bacon. At the same time, the hold-down roller moves forwardly and downwardly toward the traction wheel. The hold-down roller is mounted on a lever which is pivotable about an axis located at a level below and rearwardly of the discharge end of the conveyor, as considered in the direction of advancement of slabs toward and into the passage.

21 Claims, 5 Drawing Figures

SKINNING MACHINE FOR BACON OR THE LIKE

BACKGROUND OF THE INVENTION

The present invention relates to slicing machines for pieces of meat or the like, especially to skinning or derinding machines for bacon. More particularly, the invention relates to slicing or skinning machines of the type wherein a slab of bacon or the like is transported into the range of a traction wheel which, in turn, feeds the material to be sliced or skinned against a stationary knife.

In certain presently known machines of the above outlined character, the transporting means includes or is constituted by a belt conveyor whose upper reach advances the product to be sliced or skinned and has a supporting surface which is located in a supporting plane and whose imaginary extension is substantially tangential to the traction wheel. In most instances, the place of the extension of the supporting surface is located somewhere between two parallel planes of which includes the axis of the traction wheel and the other of which is tangential to the peripheral surface of the traction wheel. Such machines normally further comprise a hold-down device (e.g., a rotary member) which is installed in the region of the traction wheel and serves to urge the product against the periphery of the traction wheel. The traction wheel, the knife and the hold-down device are not accessible when the machine is in operation. Shielding of the slicing or skinning station is desirable and often prescribed in order to reduce the likelihood of injury to attendants. Consequently, an attendant cannot introduce the leader of a slab of bacon into the range of operation of the cutting edge of the knife, and the attendant cannot "assist" a slab to advance all the way into the actual slicing or skinning zone. This presents problems in many presently known machines, especially during the initial stage of a skinning operation. One of the reasons for such problems is that the thickness of bacon normally varies from slab to slab.

OBJECTS AND SUMMARY OF THE INVENTION

An object of the invention is to provide a machine for slicing bacon or the like, especially a bacon skinning machine, which is constructed and assembled in such a way that it can properly and predictably sever products of different size (especially thickness) and/or shape in spite of the fact that the severing station is not accessible to the attendant.

Another object of the invention is to provide novel and improved hold-down and transporting means for use in a machine of the above outlined character.

A further object of the invention is to provide the machine with novel and improved means for automatically shifting the transporting and/or hold down means to an optimum position for processing a product whose thickness differs from the thickness of the preceding product.

An additional object of the invention is to provide the machine with novel and improved means for synchronizing the movements of all moving parts.

Another object of the invention is to provide a skinning machine which requires a minimum of maintenance and whose versatility greatly exceeds the versatility of presently known machines.

An ancillary object of the invention is to provide a novel and improved bacon skinning machine.

A further object of the invention is to provide a machine whose output exceeds the output of heretofore known skinning machines for bacon or the like.

The invention is embodied in a skinning machine for bacon or like products. The machine comprises a frame or housing, a knife which is mounted in the frame, an endless belt conveyor or other suitable means for transporting the products toward the knife, a traction wheel which is rotatably mounted in the frame intermediate the knife and the transporting means and has a preferably serrated or otherwise roughened peripheral surface serving to advance the products against the knife, means for mounting the transporting means in the frame in such a way that an end portion of the transporting means is adjacent to the traction wheel, a preferably rotary hold-down device movably supported by the frame and defining with the end portion of the transporting means a passage for movement of products toward the peripheral surface of the traction wheel, and means for movably supporting at least the aforementioned end portion of the transporting means for movement in directions to change the position of the passage relative to the traction wheel and to thereby expose different (i.e., larger or smaller) portions of the peripheral surface for engagement by the oncoming products. The arrangement is such that a relatively thick product can engage a larger portion of the peripheral surface than a relatively thin product.

The transporting means has a supporting surface for the products and, owing to the aforementioned movability of the end portion of the transporting means, such supporting surface is movable between a plurality of positions including a position in which an imaginary extension of the supporting surface is tangential or nearly tangential to the traction wheel and additional positions in which the imaginary extension of the supporting surface is nearer to the axis of the traction wheel.

It is presently preferred to mount the transporting means in such a way that its end portion is pivotable with respect to the frame, most preferably about an axis which is remote from the traction wheel and is substantially parallel to the axis of the traction wheel.

The machine preferably further comprises a pivotable lever or an analogous support for the hold-down device, and means for pivotably securing the support to the frame. The securing means is preferably located rearwardly of the end portion of the transporting means, as considered in the direction of transport of products toward and through the passage. Also, the securing means (e.g., a horizontal fulcrum for the lower end portion of the lever which forms part of or constitutes the support for the hold-down device) is preferably located at a level below the end portion of the transporting means. Such mounting of the hold-down device insures that the upward movement of hold-down device in response to introduction of a relatively thick slab into the passage is less pronounced than the downward movement of the end portion of the transporting means. Adjustable biasing means are preferably provided to urge the end portion of the transporting means in a direction to reduce the width of the passage and to urge the hold-down device in a direction toward the traction wheel.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
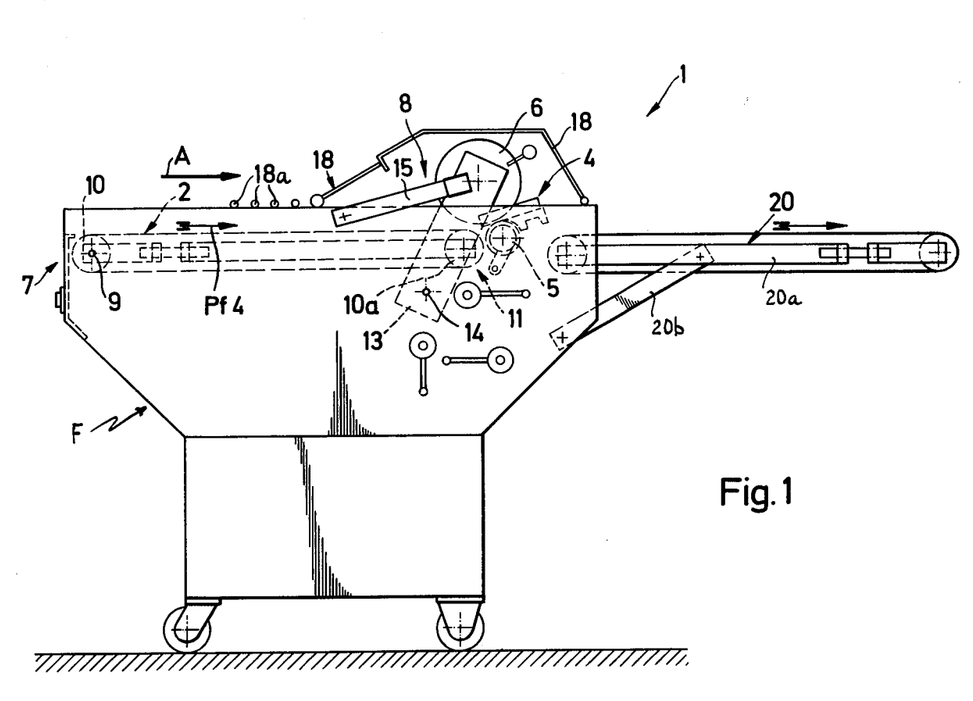
FIG. 1 is a somewhat schematic side elevational view of a skinning machine which embodies the invention.

Referring to FIG. 1, there is shown a machine 1 which comprises a wheel-mounted housing or frame F for a transporting unit which serves to advance successive pieces of material to be severed (hereinafter referred to as slabs of bacon) to a severing station 8. The transporting unit comprises a belt conveyor 2 whose horizontal or nearly horizontal upper reach advances successive slabs in the direction indicated by arrow Pf3 shown in FIG. 2. The severing station 8 is located close to the right-hand end of the frame F, as viewed in FIG. 1, and includes a knife 3 which is mounted in a holder 4, a traction wheel 5, and a rotary member 6 which constitutes a hold-down device (see also FIG. 2 which shows the upper half of that side of the frame F that faces away from the observer of FIG. 1). The rear end portion 7 of the conveyor 2 is accessible to an attendant who places successive slabs 12 or 12a onto the upper reach of the endless flexible element 2a of the conveyor 2 in such a way that the rind 23 contacts the conveyor, as shown in FIG. 3. A slab 12 or 12a which is transported by the supporting surface of the conveyor 2 (i.e., by the exposed upper side of the upper reach of the endless flexible element 2a) is engaged by the serrated peripheral surface of the traction wheel 5 and is moved against the knife 3 whose cutting edge separates the rind 23 from the remaining part 12' or 12a' of the slab 12 or 12a. The hold-down device 6 insures that the slab 12 or 12a bears against the peripheral surface of the traction wheel 5.

Figure 2:
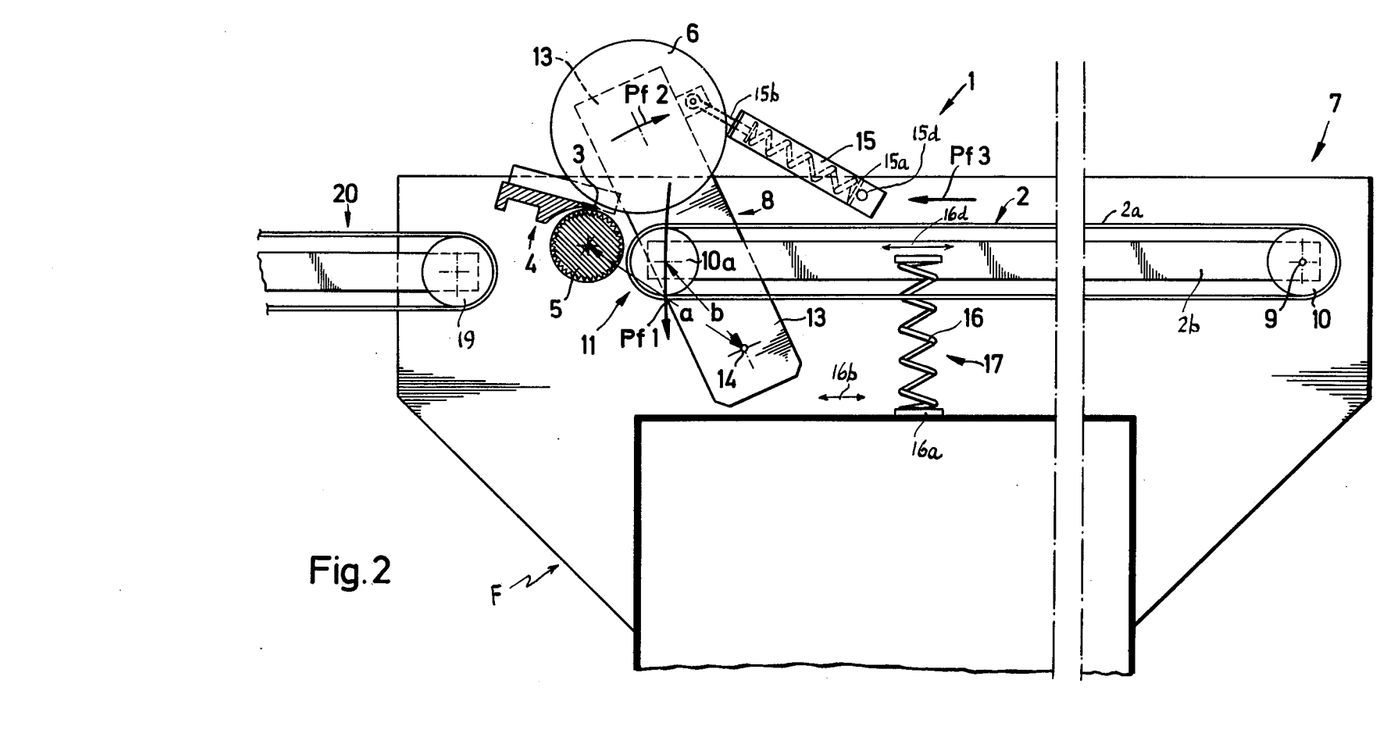
FIG. 2 is an enlarged fragmentary partly side elevational and partly sectional view of a portion of the machine of FIG. 1.
Figure 3:
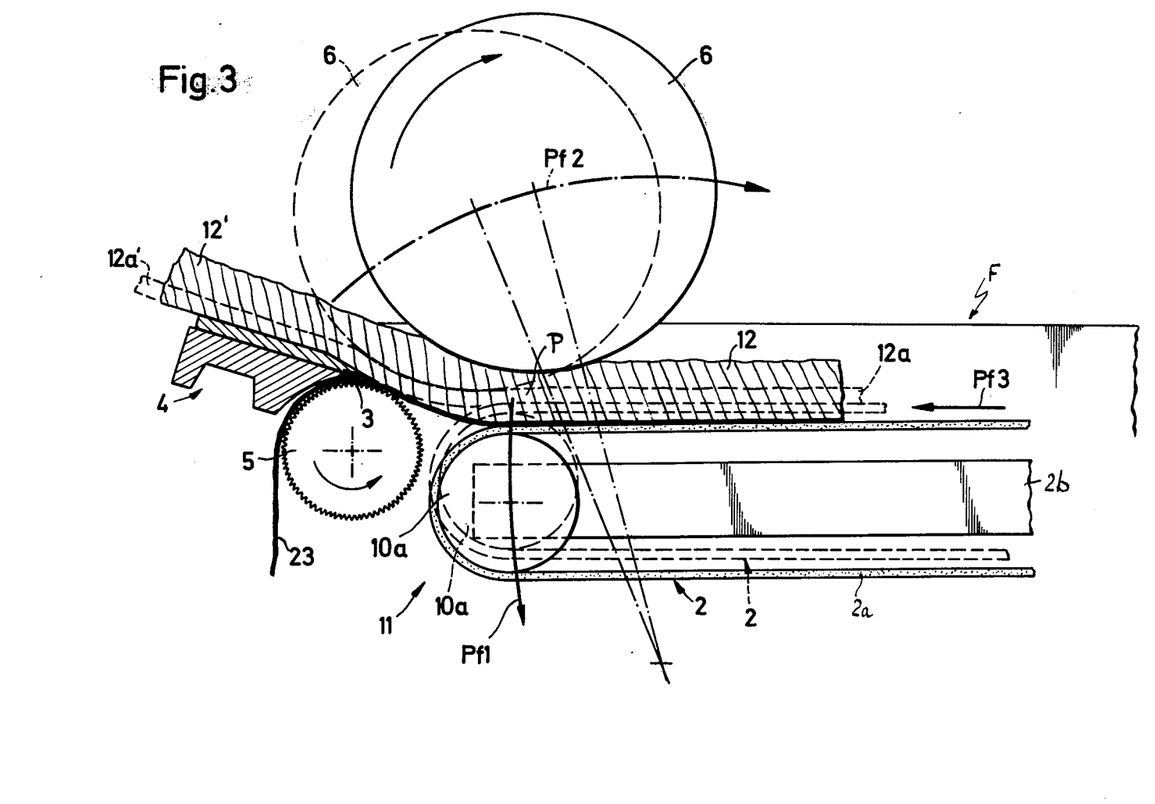
FIG. 3 is a greatly enlarged view of the severing or slicing station in the machine of FIG. 1.

In accordance with a feature of the invention, the conveyor 2 is movable relative to the traction wheel 5 in and counter to the direction indicated by the arrow Pf1 shown in FIG. 2. At the same time, the hold-down device 6 is movable in and counter to the direction indicated by arrow Pf2. The front end portion 11 of the conveyor 2 (namely, that end turn which is adjacent to the traction wheel 5) is movable about the axis of a shaft 9 which is mounted in the frame F and carries the rear pulley 10 for the endless flexible element 2a of the conveyor 2. In other words, the conveyor 2 can pivot back and forth about a horizontal axis which is located in the region of the rear end portion 7 and is parallel to the axis of the traction wheel 5. Such movement of the front end portion 11 of the conveyor 2 renders it possible to change the extent to which the slab 12 or 12a which is advanced in the direction indicated by arrow Pf3 of FIG. 2 engages the peripheral surface of the traction wheel 5. This is illustrated in FIG. 3 wherein the rind 23 (shown by a heavy line) bears against the toothed or serrated peripheral surface of the traction wheel 5. The rind 23 advances below the cutting edge of the knife 3 and descends into a collecting receptacle or onto a take-off conveyor (not shown). The major portion 12' of the severed slab 12 advances along and beyond the upper side of the knife 3. The arrangement is such that the end portion 11 of the conveyor 2 moves downwardly when the upper reach of the flexible element 2a transports a relatively thick slab 12 of bacon, and that the end portion 11 moves upwardly when the conveyor 2 transports a relatively thin slab 12a (indicated by FIG. 3 by broken lines). Thus, the peripheral surface of the traction wheel 5 engages a larger portion of the rind 23 when the slab is thick and a relatively small portion of the rind when the machine 1 treats a relatively thin slab. The position of the end portion 11 when the conveyor 2 transports a relatively thin slab 12a is indicated in FIG. 3 by broken lines.

The position of the hold-down device 6 changes simultaneously with changes in the position of the end portion 11. As shown in FIG. 3, the hold-down device 6 moves upwardly and away from the traction wheel 5 when the latter engages the thick slab 12 (the corresponding position of the device 6 is shown by solid lines). The hold-down device 6 moves downwardly and toward the traction wheel 5 (see the broken-line position of the hold-down device) when the conveyor 2 transports the thinner slab 12a.

The means for moving the hold-down device 6 as a function of the difference between the thicknesses of two successive slabs 12 and 12a comprises a support here shown as a lever 13 which is fulcrumed in the frame F by securing means 14 and extends upwardly and forwardly in front of the traction wheel 5. The shaft 6b of the hold-down device 6 is mounted in the upper portion of the lever 13. The shaft for the front pulley 10a of the conveyor 2 is located at a level intermediate the shaft 6b for the device 6 and the fulcrum or securing means 14. The latter is located at a level below and rearwardly of the traction wheel 5, as considered in the direction indicated by the arrow Pf3 of FIG. 2. The hold-down device 6 is rotated in a direction to move the slab 12 or 12a toward the traction wheel 5.

The lever 13 pivots counterclockwise, as viewed in FIG. 2, when a thick slab 12 is followed by a thinner slab 12a, i.e., the shaft 6b of the hold-down device 6 then moves along an arcuate path whose center of curvature is located on the axis of the fulcrum 13, and the hold-down device moves counter to the direction indicated by the arrow Pf2. When the hold-down device 6 moves toward the traction wheel 5, the distance between the peripheral surfaces of 5 and 6 decreases more pronouncedly than the distance between the hold-down device 6 and a reversing roller 10a of the conveyor 2. This is due to the fact that the eccentricity of the roller 10a with respect to the center of curvature of the path defined by the arrow Pf2 is less than the eccentricity of the traction wheel 5. Reference may be had to FIG. 2 wherein the distance between the axis of the pulley roller 10a and the axis of the fulcrum 14 is shown at b, and the distance between the axes of the fulcrum 14 and traction wheel 5 is shown at a. The magnitude of the force which is necessary to change the position of the hold-down device 6 has a predetermined relationship to the aforementioned ratio of eccentricities. Such force must act upon the hold-down device 6 above the roller 10a, and its radial component is larger than the tangential component (as considered with respect to the path of movement of the axis of the hold-down device 6). The just mentioned force must be furnished by a slab 12 or 12a which enters the passage P between the end portion 11 and the hold-down device 6. A force of similar magnitude is applied against the end portion 11. However, and since the end portion 11 moves along an arcuate path whose center of curvature is located on the axis of the shaft 9, the force acting upon the end portion 11 is substantially tangential to the path which is denoted by the arrow Pf1 of FIG. 2.

The aforedescribed kinematic relationships, together with the action of a biasing device 15 for the lever 13, and with the action of a restoring unit 17 which includes a helical spring 16 tending to pivot the conveyor 2 clockwise, as viewed in FIG. 2, insure that the positions of the end portion 11 and hold-down device 6 change automatically when a thinner slab 12a is followed by a thicker slab 12 or vice versa. The extent to which the end portion 11 yields by moving downwardly when the conveyor 2 transports a relatively thick slab 12 exceeds the extent to which the hold-down device 6 yields by moving upwardly. This insures that the end portion 11 exposes a larger portion of the peripheral surface of the traction wheel 5 for engagement by the oncoming thicker slab 12 or 12a. Otherwise stated, the end portion 11 yields in a direction to move the imaginary extension of the supporting surface or upper side of the upper reach of the endless flexible element 2a of the conveyor 2 nearer to the axis of the traction wheel 5. This guarantees that the peripheral surface of the traction wheel 5 firmly engages a relatively large portion of the underside of the rind 23 while advancing the thick slab 12 toward the cutting edge of the knife 3.

The bias of the device 15 and/or spring 16 is selected with a view to insure that the pressure of conveyor 2 and hold-down device 6 upon the advancing slab changes in dependency on the differences in thicknesses of successive slabs. It is possible to provide suitable adjusting means for changing the bias of the device 15 and/or spring 16. For example, the retainer 16a at the lower end of the spring 16 can be mounted on a screw or bolt which is in mesh with a portion of the frame F. The upper end convolution of the spring 16 bears against a beam 2b which supports the shaft for the roller 10a. The bias of the spring in the device 15 can be changed by moving the right-hand retainer 15a in the cylindrical housing of the spring toward or away from the rod 15b which articulately connects the device 15 to the lever 13. The bias of the spring 16 can also be adjusted by moving this spring sideways toward or away from the shaft 9 (see the arrow 16b) or by moving the uppermost convolution of the spring 16 relative to the beam 2b for the shaft of the roller 10a (see the arrow 16d). The bias of the device 15 can be adjusted by shifting its connection 15d to the frame F in or counter to the direction indicated by the arrow Pf3 of FIG. 2. The device 15 biases the lever 13 in a direction to move the hold-down device 6 nearer to the traction wheel 5.

The hold-down device 6 performs several functions. Moreover, its mounting on the lever 13 in a predetermined position relative to the roller 10a and traction wheel 5 enables the hold-down device 6 to offer pronounced resistance to substantially radial forces acting in the region of the roller 10a; consequently, and since a similar force also acts upon the end portion 11, the latter yields by moving downwardly and by thus allowing a larger portion of the rind 23 to engage the peripheral surface of the traction wheel 5. Furthermore, and as shown in FIG. 3, the movement of end portion 11 in the direction indicated by arrow Pf1 results in flexing of the slab 12 in the region between the roller 10a and hold-down device 6. The flexing is desirable; in fact, the slabs are flexed by hand in rudimentary or relatively simple skinning machines wherein the severing station is accessible when the machine is in use. Such flexing is effected by holding the slab at an appropriate angle with respect to the traction wheel and the knife, and by promoting the flexure by hand. The flexing insures that the cutting edge of the knife penetrates into the desired part of the leader of an oncoming slab.

The pressure of the hold-down device 6 upon the slabs 12 or 12a in the proximity of the traction wheel 5 is less pronounced than in the region immediately above the roller 10a. This will be readily appreciated since the forces acting upon the hold-down device 6 above the traction wheel 5 are substantially tangential whereas the forces acting upon the hold-down device above the roller 10a are substantially or predominantly radial. Again, the terms "tangential" and "radial" refer to the arcuate path which is indicated by the arrow Pf2, i.e., to the arc along which the axis of the hold-down device 6 moves about the fulcrum 14 for the lever 13.

Figure 4:
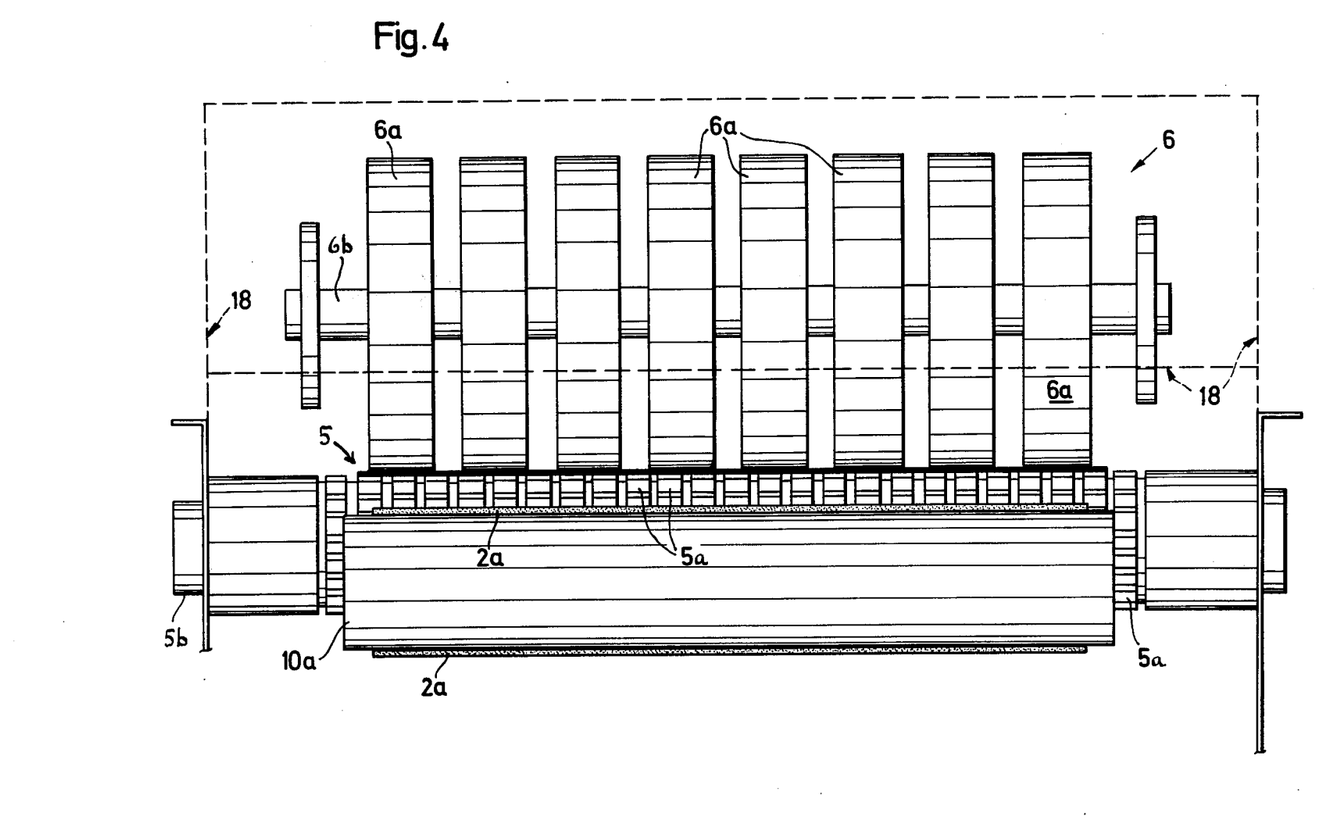
FIG. 4 is an enlarged fragmentary end elevational view as seen in the direction of arrow A shown in FIG. 1.

FIG. 4 shows a presently preferred construction of the hold-down device 6. The roller 10a is elongated. The traction wheel 5 includes a series of coaxial gears 5a mounted on a common shaft 5b.

The hold-down device 6 comprises a plurality of coaxial disk-shaped components 6a which are spaced apart from each other, as considered in the axial direction of the hold-down device. It is preferred to make the disks 6a (or at least the peripheral portions of these disks) of an elastomeric material. The selection of such elastomeric material, plus the subdivision of the hold-down device 6 into several coaxial spaced-apart disks, insures that the device 6 can properly engage and depress slabs having irregular upper surfaces, i.e., that the hold-down device insures practically continuous contact between the entire underside of the rind 23 and the supporting surface of the upperreach of the flexible element 2a. This further insures that the rind 23 is substantially parallel to the cutting edge of the knife 3 which, in turn, insures that the knife will separate the rind 23 from the major portion of the slab with minimal losses of valuable (edible) material.

FIG. 4 further shows, by broken lines, a shroud or guard 18 which prevents access to the severing station 8 when the machine 1 is in use. The guard 18 is also shown in the upper portion of FIG. 1. The major portion of this guard resembles a cage which spacedly surrounds the severing station 8; furthermore, the guard comprises a portion 18a which overlies certain parts of the upper reach of the flexible element 2a. The effective length of the guard 18, as considered in the longitudinal direction of the conveyor 2, is preferably such that the inlet between the portion 18a of the guard and the upper reach of the flexible element 2a (the inlet is indicated by the arrow Pf4 shown in FIG. 1) is sufficiently remote from the knife 3 to invariably insure that an attendant cannot reach the severing station 8 even if he or she extends his or her hand into and beyond the inlet. In other words, the distance between the leftmost part of the portion 18a of the guard 18 (as viewed in FIG. 1)

and the severing station 8 should exceed the length of an arm. The provision of the guard 18 renders it necessary to insure automatic movement of the leader of a freshly introduced slab 12 or 12a into the range of the cutting edge of the knife 3. All that an attendant is supposed to and can do is to properly position a fresh slab 12 or 12a on the upper reach of the flexible element 2a ahead of the inlet Pf4, whereupon the parts of the machine take over and automatically advance the slab 12 or 12a into the range of the cutting edge in such a way that the rind 23 is separated with minimal waste of edible material. The aforedescribed construction and mounting of the conveyor 2 and hold-down device 6 insure such automatic processing of slabs; furthermore, these parts insure predictable engagement of successive slabs with the knife 3 and they also insure that the machine 1 requires a minimum of maintenance and attention. Each slab can immediately follow the preceding slab, and the knife 3 will properly separate the rind on slabs of constant or nearly constant thickness as well as on slabs whose thickness varies within a wide range.

Figure 5:
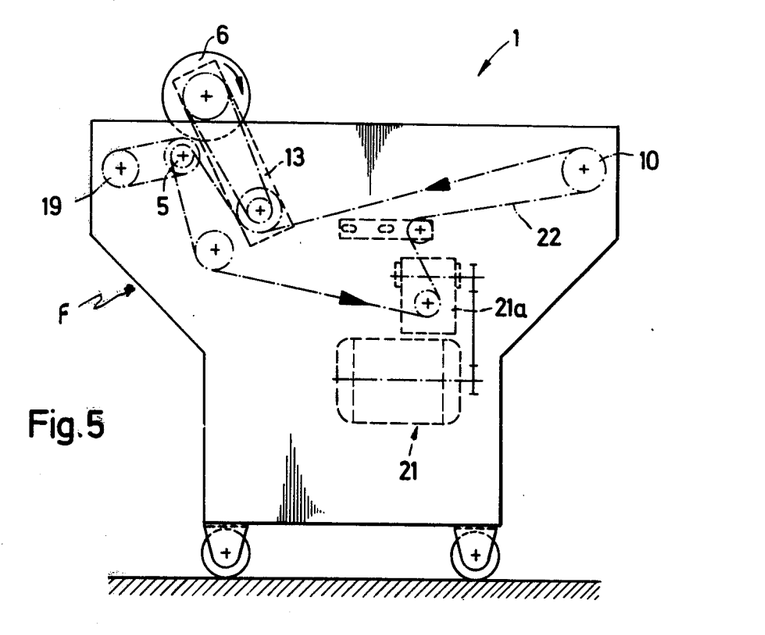
FIG. 5 is a view which shows that side of the machine remote from the observer of FIG. 1.

The drive means for the moving parts of the machine 1 is shown in FIG. 5. The main prime mover 21 (e.g., a constant-speed electric motor) which is mounted in or on the frame F drives the input element of a variable-speed transmission 21a whose output element drives an endless flexible driving element 22 (e.g., a toothed belt or a link chain). The belt or chain 22 drives the motion receiving reversing roller 10 of the conveyor 2 (i.e., that rotary member of the conveyor 2 which is remote from the severing station 8 and whose shaft 9 is mounted directly in the frame). The belt or chain 22 further drives the rotary member or pulley 19 of a removing conveyor 20 for skinned bacon 12' or 12a'. The shaft for the pulley 19 is mounted in the frame F but the major part of the conveyor 20 is mounted on an elongated arm 20a (FIG. 1) whose inclination can be adjusted at 20b to direct the skinned slabs to a further processing station, for example, to a station where such slabs are sliced prior to packaging. The belt or chain 22 further drives the hold-down device 6 and the traction wheel 5.

The provision of a single prime mover 21 and of a single endless flexible driving element 22 is desirable and advantageous for several reasons, i.e., it is economical and the movements of all parts are invariably synchronized especially since the element 22 is preferably toothed or has links to insure the transmission of torque without any slippage.

An important advantage of the improved skinning machine is that the traction wheel can properly engage thick, thin or average slabs and that the extent of engagement between the slabs and the peripheral surface of the traction wheel is a function of the thickness of slabs.

It is clear that the machine is susceptible of many additional modifications without departing from the spirit of the invention. For example, the entire transporting unit 2 can be moved relative to the frame F when a thicker slab is followed by a thinner slab or vice versa. The illustrated construction is preferred at this time because only a relatively small part of the transporting unit need be movably mounted in the frame. Furthermore, the level of the rear end portion 7 remains constant which is convenient to the workman in charge of placing fresh slabs onto the upper reach of the belt 2a. It is also possible to employ a transporting unit which does not embody or constitute an endless belt conveyor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A skinning machine for bacon or like products, comprising a frame; a knife mounted in said frame; means for transporting the products toward said knife; a traction wheel rotatably mounted in said frame intermediate said knife and said transporting means and having a peripheral surface arranged to advance the products against said knife, said transporting means being mounted in said frame and having an end portion adjacent to said wheel; a hold-down device movably supported by said frame and defining with said end portion a passage for movement of products toward said wheel; and means for movably supporting at least said end portion of said transporting means for movement in directions to change the position of said passage relative to said wheel and to thereby expose different portions of said peripheral surface for engagement by the oncoming products.

2. A machine as defined in claim 1, wherein said transporting means has a supporting surface substantially located in a plane for transporting products along said plane; and further comprising means for mounting said transporting means for movement between a plurality of positions including a position in which said plane of said supporting surface is substantially tangential to said traction wheel and additional positions in which said plane is nearer to the axis of said traction wheel.

3. A machine as defined in claim 1, and further comprising means mounting said end portion of said transporting means for pivoting with respect to said frame.

4. A machine as defined in claim 3, wherein mounting means mounts said end portion of said transporting means for pivoting about an axis which is remote from and is substantially parallel to the axis of said traction wheel.

5. A machine as defined in claim 1, further comprising a support for said hold-down device and means for pivotably securing said support to said frame, said securing means being located rearwardly of said end portion of said transporting means, as considered in the direction of movement of products toward and through said passage.

6. A machine as defined in claim 5, wherein said securing means is located at a level below said end portion of said transporting means.

7. A machine as defined in claim 5, wherein said transporting means comprises an endless flexible element and a plurality of rotary members, said flexible element being trained over said rotary members and one of said rotary members being located at said end portion of said transporting means, the distance between said securing means and the axis of said one rotary member being less than the distance between said securing means and the axis of said traction wheel.

8. A machine as defined in claim 5, further comprising means for biasing said support in a direction to move said hold-down device nearer to said traction wheel.

9. A machine as defined in claim 8, further comprising means for adjusting the bias of said biasing means.

10. A machine as defined in claim 5, further comprising means for biasing said end portion of said transporting means in a direction to reduce the width of said passage.

11. A machine as defined in claim 10, wherein said biasing means comprises a spring which is installed in said frame at a level below said transporting means.

12. A machine as defined in claim 10, further comprising means for adjusting the bias of said biasing means.

13. A machine as defined in claim 5, further comprising first biasing means for urging said end portion in a direction to reduce the width of said passage and second biasing means for urging said support in a direction to move said hold-down device toward said traction wheel, the bias of said first and second biasing means being such that the force with which said hold-down device engages a product in said passage exceeds the force with which said end portion engages the same product in said passage.

14. A machine as defined in claim 1, wherein said hold-down device comprises an elastic product-engaging portion.

15. A machine as defined in claim 1, wherein said hold-down device includes a plurality of discrete components which are spaced apart from each other, as considered transversely of the direction of transport of products in said passage.

16. A machine as defined in claim 1, further comprising drive means for said transporting means, said transporting means including a motion receiving portion remote from said end portion and operatively connected with said drive means.

17. A machine as defined in claim 1, wherein said hold-down device comprises a rotary member and further comprising common drive means for said traction wheel, said hold-down device and said transporting means.

18. A machine as defined in claim 17, wherein said drive means comprises a single endless flexible element having means for transmitting motion without slippage.

19. A machine as defined in claim 18, further comprising conveyor means for receiving skinned products, said conveyor means including a rotary element receiving motion from said endless flexible element.

20. A machine as defined in claim 1, further comprising a guard mounted on said frame and arranged to prevent access to said hold-down device, said traction wheel and said knife.

21. A machine as defined in claim 20, wherein said guard includes a portion which overlies that part of said transporting means which includes said end portion.

* * * * *